AUTOMATIC TONG EXTRACTING AND RESETTING MECHANISM

Original Filed Aug. 5, 1952 4 Sheets-Sheet 1

INVENTOR.
ERNEST E. ECKSTEIN
BY
Cook & Robinson
ATTORNEYS

Sept. 6, 1955 E. E. ECKSTEIN Re. 24,058

AUTOMATIC TONG EXTRACTING AND RESETTING MECHANISM

Original Filed Aug. 5, 1952 4 Sheets-Sheet 2

Inventor

ERNEST E. ECKSTEIN

By Cook & Robinson

Attorney

Sept. 6, 1955 E. E. ECKSTEIN Re. 24,058

AUTOMATIC TONG EXTRACTING AND RESETTING MECHANISM

Original Filed Aug. 5, 1952 4 Sheets-Sheet 3

Inventor
ERNEST E. ECKSTEIN

By Cook & Robinson
Attorney

AUTOMATIC TONG EXTRACTING AND RESETTING MECHANISM

Original Filed Aug. 5, 1952 4 Sheets-Sheet 4

Inventor
ERNEST E. ECKSTEIN

Cook & Robinson
Attorneys

United States Patent Office

Re. 24,058
Reissued Sept. 6, 1955

24,058

AUTOMATIC TONG EXTRACTING AND RESETTING MECHANISM

Ernest E. Eckstein, Elgin, Oreg.

Original No. 2,656,212, dated October 20, 1953, Serial No. 302,707, August 5, 1952. Application for reissue January 4, 1954, Serial No. 402,198

11 Claims. (Cl. 294—110)

Matter enclosed in heavy brackets [ ] appears in the original patent but forms no part of this reissue specification; matter printed in italics indicates the additions made by reissue.

This invention relates to a tong operating mechanism for use in connection with log handling equipment; the present application being a continuation in part of my co-pending application filed under Serial No. 280,886 *now abandoned*. More particularly, the invention has reference to an automatic tong control apparatus designed primarily for use in connection with the cable and cable winding mechanism of any of the present day hoisting machines, or loaders, as employed for the handling and more particularly for the cold decking of logs. It is not the intent, however, that the present invention shall be limited in its use to log handling operations but that it be understood to be applicable for any other use not inconsistent with its structure and disclosed mode of operation.

It is the principal object of this invention to provide a simple, effective, and automatically operating tong extracting and tong re-setting means for use in connection with a cable and cable winding devices as employed for the lifting and loading of heavy objects by means of a pair of tongs; the present apparatus being operable to effect the extraction of the teeth of the tong jaws from the lifted object after it has been lowered and brought to rest on a support, and for then resetting the tongs for self closing on the next object that is to be lifted thereby.

More specifically stated, it is the primary object of this invention to provide a mechanism for use in connection with a pair of tongs and a boom type hoist, or the like, for handling exceedingly heavy logs, and which mechanism, in its functional combination with the hoisting cable and tongs, serves as a connecting link between them. Furthermore, a mechanism that includes therein a normally inactive tong release connection that can be rendered operative for that purpose by a slack producing manipulation of the hoisting cable, after the lifted log has been lowered to a position of rest on a support.

It is a further object of this invention to provide a tong extracting and re-setting mechanism of the above stated character, that eliminates the usual requirement of an extra workman for that purpose. Furthermore, an automatic tong extracting and re-setting mechanism that is powered by and controlled entirely through manipulation of the hoisting cable, under control of the hoist operator.

Further objects and advantages of the present invention reside in the details of construction and combination of parts employed therein, in their functional relationship and in the mode of use of the mechanism as will hereinafter be described.

In accomplishing the above mentioned and other objects of the invention, I have provided the improved details of construction, the preferred forms of which are illustrated in the accompanying drawings, wherein:

Fig. 1a is a similar view of the device as seen from the sides opposite those shown in Fig. 1a.

Fig. 1b is a view showing manner of applying open tongs to a large log.

Figure 5:
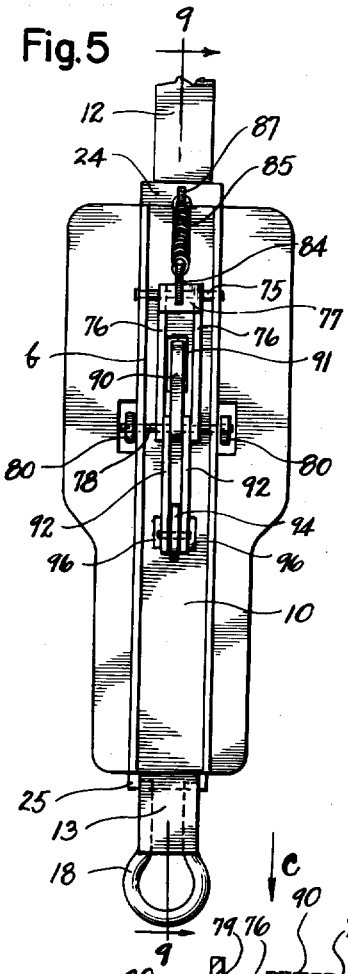
Figure 6:
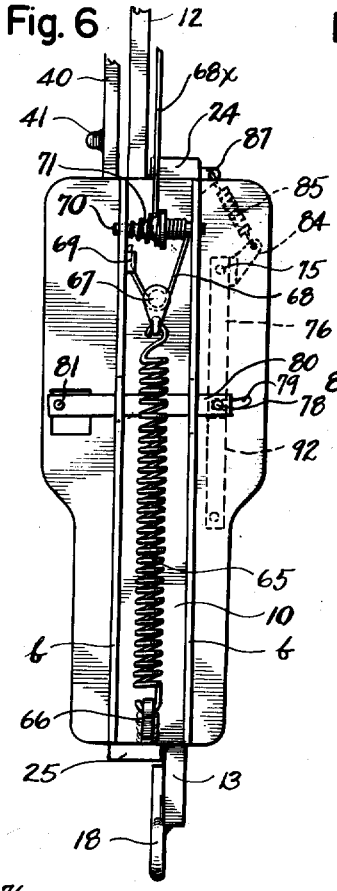
Figure 7:
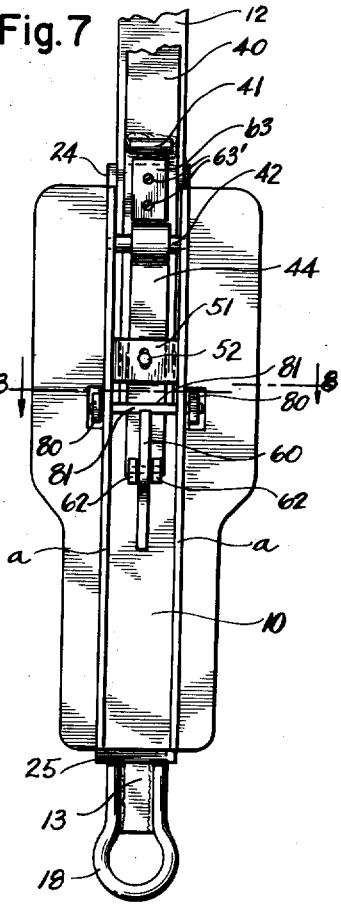

Figs. 5, 6 and 7 respectively, are elevations of different sides of the housing and parts mounted thereon.

Figure 8:
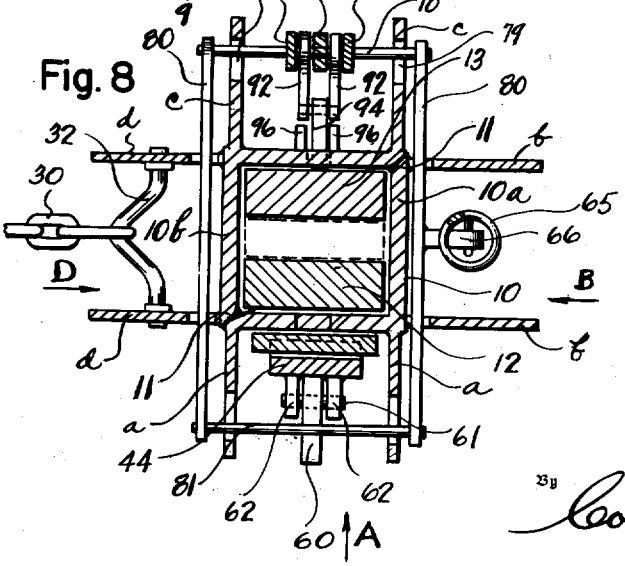

Fig. 8 is an enlarged cross-section, taken on line 8—8 in Fig. 7, particularly illustrating parts of the latch release mechanism.

Figure 9:
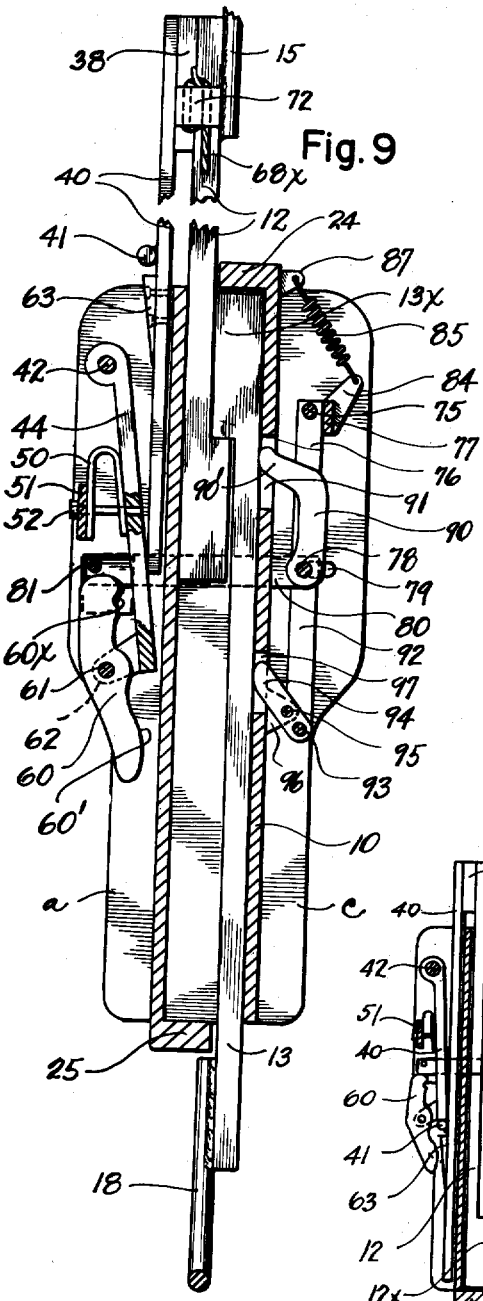

Fig. 9 is a central, longitudinal sectional view, taken on line 9—9 in Fig. 5, showing the normal relationship of parts associated with the housing, while a log is being supported and conveyed by the tongs.

Figure 10:
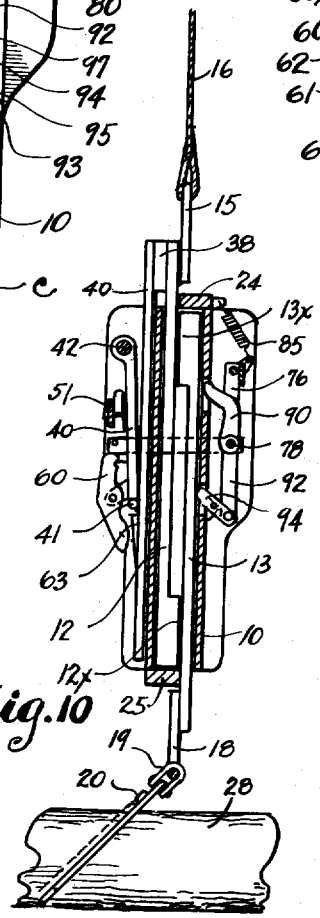
Figure 11:
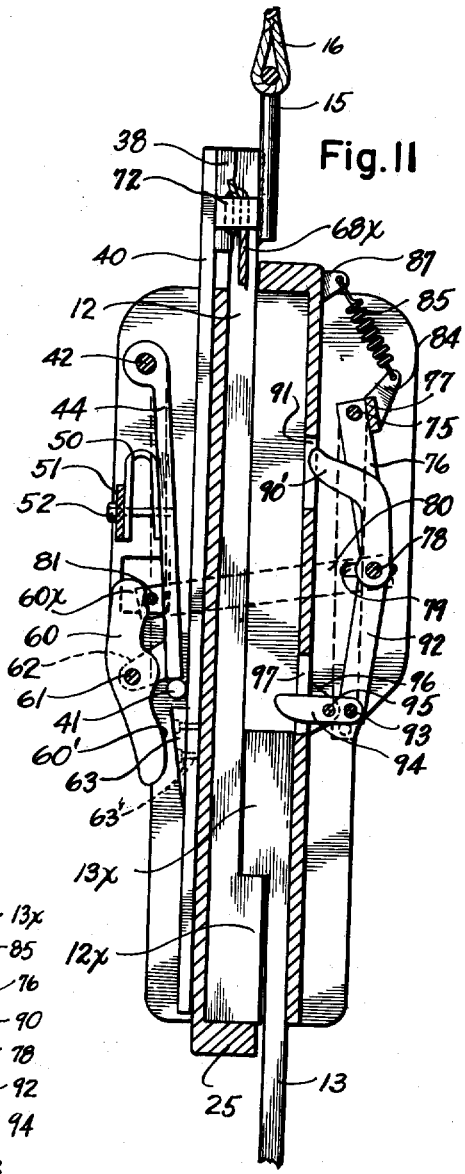

Figs. 10 and 11 are similar views illustrating, respectively, sequential operations for the extraction and then the re-setting of the tongs.

Figure 12:
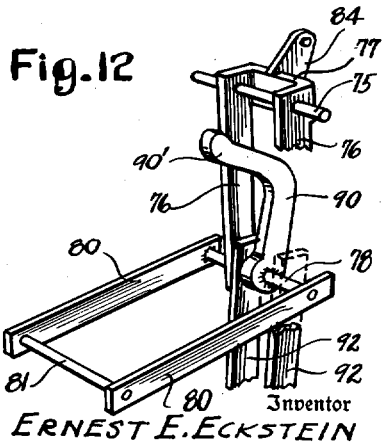

Fig. 12 is a perspective view of certain parts of the latch releasing mechanism.

Referring more in detail to the drawings:

The mechanism of this invention, as used in combination with a pair of tongs and a hoisting cable, comprises a rather elongated, hollow or tubular housing 10. This housing, preferably is uniformly square in horizontal cross-section and is open from end to end, as shown in Fig. 9. In the present instance, the housing 10, as best shown in Fig. 8, is made of two pieces of angle iron, 10a and 10b, having equal lengths and equal cross-sectional dimensions; these irons having their flanges disposed edge to edge, and welded together along the engaged edges, as at 11, thus to form a rigid, tubular housing. However, a similar housing, together with the flanges shown thereon and later described, might be cast in a single piece, or otherwise formed, without departing from the spirit of the invention. In a device now in use for handling large logs, the housing 10 is thirty inches long and measures about four inches across each side face. It provides an inside passage that is three inches square in its horizontal dimensions.

For the purposes presently understood, the housing 10 is formed on each of its four sides and extending the full length thereof, with spaced parallel flanges. For purpose of explanation, the four sides of the housing have been designated in Fig. 8 by reference letters A, B, C and D, and the parallel flanges as formed on these four sides respectively have been designated by reference letters a—a, b—b, c—c and d—d. These flanges serve as mounting means for various parts or mechanisms located between them and also they protect these mechanisms against damage in the rough use to which the device is subjected.

Slidably contained in the tubular housing 10 are the overlapped inner end portions of two elongated metal bars designated respectively by numerals 12 and 13. In the present device these bars are each thirty-six inches long, one inch thick and three inches wide, and each has a part thereof freely movable endwise in the housing between definite limits. The bar 12 extends from the upper end of the housing 10 and the bar 13, likewise, extends from the lower end thereof. On adjacent side faces of their overlapped end portions, the bars 12 and 13, are equipped respectively, with integral blocks or lugs 12x and 13x, that are adapted to engage one against the other, end to end, as shown in Figs. 9 and 11, thus to form a load lifting connection between the two bars. However, the two bars, under certain conditions as presently explained, can move endwise relative to each other and to housing 10, as indicated by their showing in Figs. 9, 10 and 11.

At its upper end, the bar 12 has a U-shaped loop forming member 15, welded or otherwise attached thereto and to this loop the outer end of a hoisting cable 16 is attached; it being understood that this cable is extended to the loop from the cable winding drum of a hoisting machine, or winch of any suitable kind that may be designed or used for the lifting and loading of logs. For example, the hoisting machine, not herein shown, may be a boom type loader of the character of that shown in U. S. Patent No. 2,327,015 issued to H. Carlson.

Figure 1:
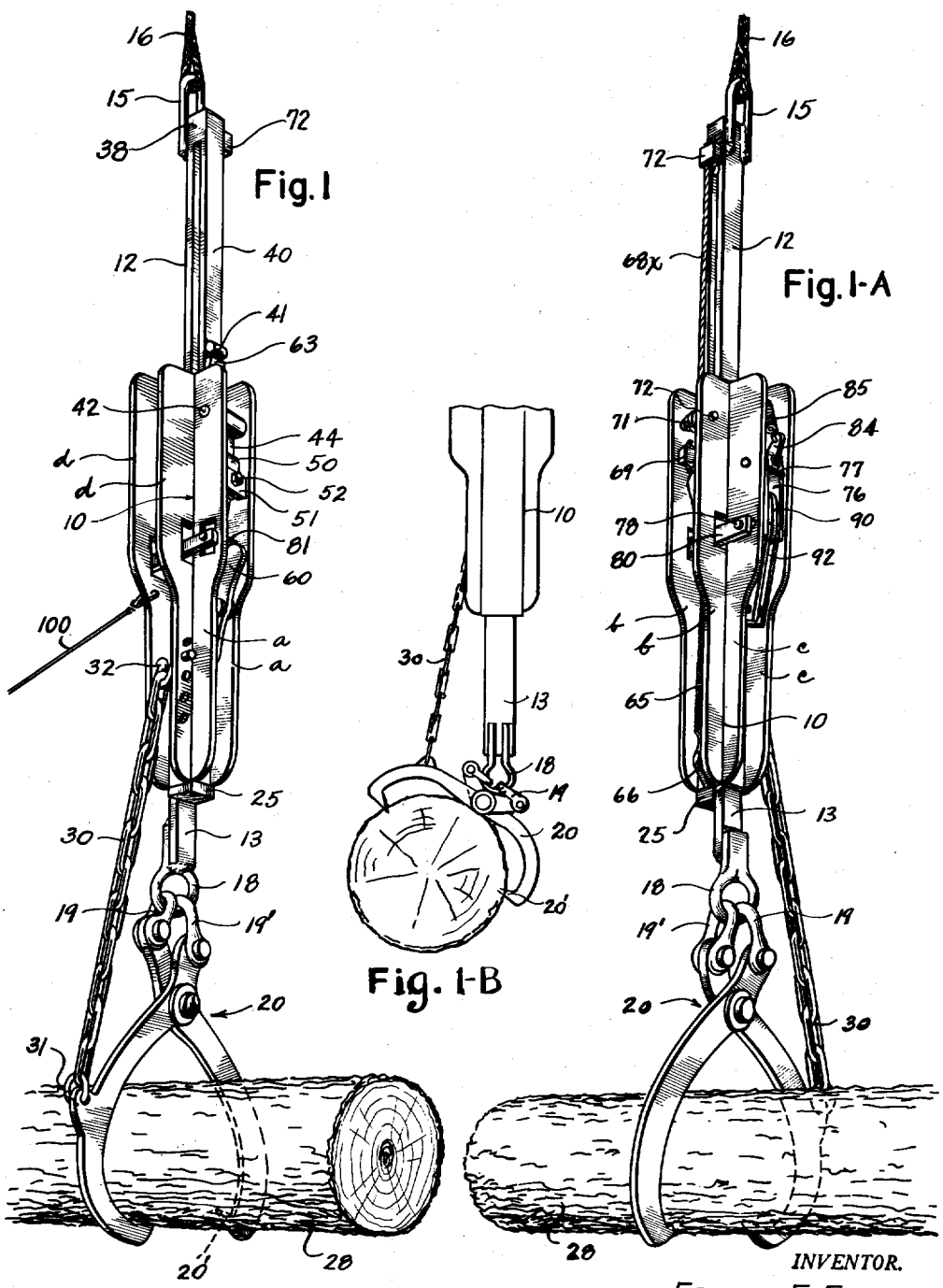
Fig. 1 is a perspective view of the automatic tong control mechanism embodied by the present invention as functionally associated with a hoisting cable and pair of log lifting tongs.

At its lower end, the bar 13 has a U-shaped loop 18 welded thereto. Applied through the loop 18 are clevises 19 and 19' and these pivotally connect the loop 18 with the upper ends of a pair of tongs 20; these tongs being of the kind normally used for log handling purposes and its jaws are equipped with inturned pointed teeth 20' as herein shown. The tongs are permitted, by reason of this means and manner of attachment to the loop 18 to be opened and closed, yet will retain their transverse relationship to the housing 10 as seen in Fig. 1. Under weight of a log, the jaws of the tongs will tend to close together, thus to maintain their hold on a log to which they are applied. Usually the teeth embed themselves in the log to substantial extent.

It will be understood further that, when the bars 12 and 13 are in such position that their inner end lugs 12x and 13x are abutted or hooked together, for example, as seen in Fig. 9, they serve as a connecting linkage between cable 16 and tongs 20 through which the load sustained by the cable can be lifted; a load, in the form of a log 28, is shown in Fig. 1.

In the usual log handling operation where the hoisting cable is attached directly to the tongs, it is a difficult and a dangerous task to manually extract the points of the tongs from the log. The present mechanism has been designed to make extraction easy and to eliminate the extra workman heretofore required for this job. The release mechanism is controlled entirely through the hoisting cable, and requires no extra manual help either for the extraction of the tongs or for their resetting. Extracting of the tongs is effected through use of a length of chain 30, or flexible cable, that is attached at one end to an eyelet 31 on one jaw of the tongs and is attached at its other end to the housing 10.

Figure 2:
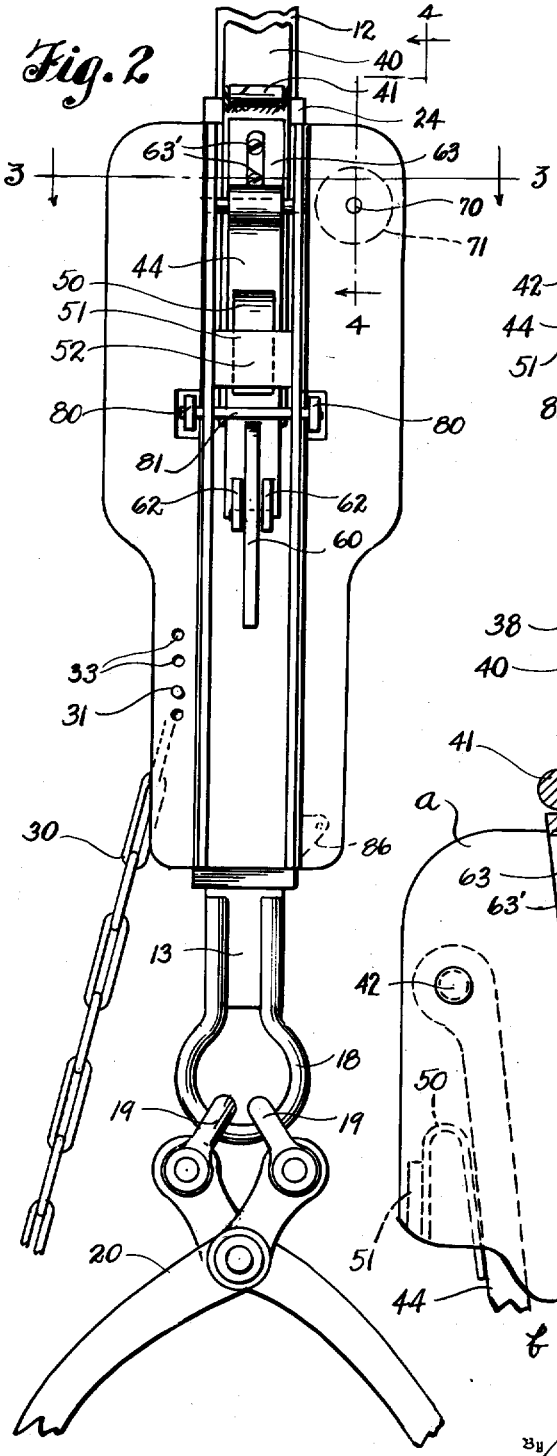
Fig. 2 is an elevation of the present device, as seen from the latch mounting side.
Figure 3:
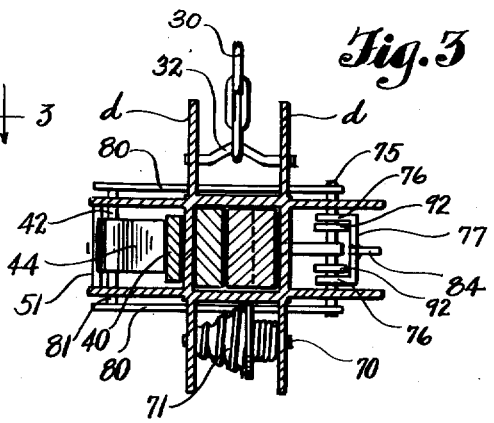
Fig. 3 is a horizontal section taken on line 3—3 in Fig. 2.

In the present showing of Figs. 1 and 2, the upper end of the chain 30 is attached to a cross pin 32 that extends between and is fixed in the flanges 3—3 on one side of the housing 10. A plurality of vertically spaced holes 33 are formed along the flanges to provide for mounting the cross member 32 at the most practical location to provide a limited amount of slack in the chain, when the parts are set as in Fig. 1.

The release of the tongs from a log through the mediacy of the hoisting cable 16 is made possible in the present instance by the provision of means for temporarily establishing through the chain 30, the log lifting connection normally existing through bars 12 and 13, and temporarily providing a limited slack, or lost-motion in the connection with the tongs as provided through the bars 12 and 13. This transfer of connection to chain 30 is made possible by use of a latch mechanism to establish a direct connection between bar 12 and housing 10 after the lost motion has been provided in the connection through bars 12 and 13. This mechanism, now described with references to the showing of parts in Figs. 1, 9, 10 and 11 is as follows:

Welded or otherwise fixed to the upper end portion of the bar 12 through the mediacy of a spacer block 38, is a flat bar 40 which is substantially coextensive with bar 12 and which extends therealong, but passing outside of the housing 10 between the flanges a—a thereof, as noted in Figs. 8, 9, 10 and 11. Welded to and directly across the outer face of bar 40, near its medial point, is a lug or stop 41. Located between the flanges, a—a, and pivotally mounted on a horizontal cross pin 42, extended therethrough, is a downwardly and inwardly directed latch 44 of bar form, the lower end of which is adapted, upon the bar 12 being fully telescoped into the housing, and the bar 40 being moved downwardly accordingly, to be engaged against the top of the stop 41 thus to provide a lifting connection between the bar 12 and housing 10.

The latch 44 is at all times yieldingly urged toward latched or holding position by an inverted U-shaped spring 50, disposed under compression between the latch and a cross-plate 51 that extends between and is welded to the flanges a—a; the spring being held in place by a bolt 52 that is fixed in the latch and extends outwardly therefrom, and through openings, in the legs of the U-shaped spring and freely through an opening 51' in the plate 51, as seen in Fig. 9.

As a means for effecting the unseating of the latch 44 from holding contact with the stop 41 to release this connection, I have mounted a latch release lever 60 on a pivot pin 61 that is extended horizontally between paired, outwardly projecting ears 62—62 applied to the lower end of the latch.

The lower end portion of the lever 60 has a longitudinally curved cam surface 60' extended substantially below the lower end of the latch. The upper end portion of the lever 60 extends upwardly along the latch and is adapted to be engaged and outwardly actuated by a release mechanism which will presently be described in connection with the showing in Figs. 10 and 11.

Also, for a purpose presently apparent, a wedge shaped block 63 is fixed to the outer face of bar 40 immediately below the stop or lug 41. This is secured for limited adjustment up or down along bar 40 by means of a securing bolt 63', thus to make the release lever 60 more or less sensitive.

Assuming the parts of the device to be so constructed and assembled, and with the understanding that the tongs 20 have been properly applied to a log as in Fig. 1 and that the log has been carried by the cable 16, to an unloading position, and has there been lowered to a position of rest on the cold deck, but that the parts of the present device are still in the normal load carrying relationship shown in Fig. 9 without any slack as yet having been permitted in cable 16, the procedure to automatically effect the extraction or release of the tongs from the log, is as follows:

First, the operator of the hoisting engine causes about two feet of slack to be paid out in cable 16. After the first few inches of slack have been produced in the cable, the bar 13 comes to rest by reason of its connection at the lower end with the tongs. The upper end of bar 13 is at this time in contact with the upper end block 24 of the housing 10 and operates as a support for the housing. Then, as the additional slack is produced in the cable, the bar 12 moves downwardly into the housing 10 and the latch release bar 40, fixed thereto moved downwardly accordingly, ultimately causing the lug 41 thereon to pass beneath and beyond the lower end of the latch lever 44, whereupon the spring 50 causes the latch 44 to snap into holding contact with the top side of the stop, as seen in Fig. 10. It is here to be noted that a lost motion connection has been established between bars 12 and 13 by reason of their lugs 12x and 13x being spaced apart to full extent.

Figure 4:
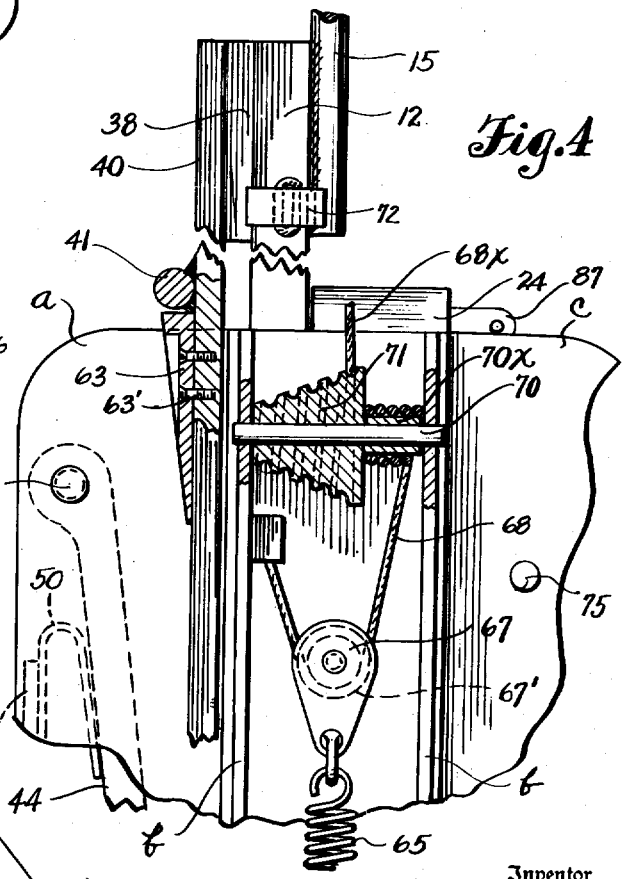
Fig. 4 is a sectional detail, taken on line 4—4 in Fig. 2, showing the slack pulling mechanism for the hoisting cable as mounted on one side of the housing.

It is necessary to insure proper operation of the present mechanism, that the housing 10 be maintained substantially in an upright position while this slack is being produced in the hoisting line. This is accomplished by means of a slack take-up mechanism that is shown best in Figs. 4 and 6. This mechanism comprises a coiled spring 65 that is disposed lengthwise of and between the housing flanges b—b and is attached at its lower end to an ear 66 that is welded to the lower end of housing 10. At its upper end, the spring connects with a pulley block 67 containing a pulley wheel 67'. A cable 68, dead ended in a lug or block 69 fixed to a flange b above the pulley block level, is extended downwardly from the lug, passed about wheel 67', then extended downwardly and wound, as shown in Fig. 4, on a sleeve 70x fixed on a horizontal cross shaft 70 that extends between and is revolubly supported by the flanges b—b. A conical drum 71 also is fixed on the cross shaft 70, and a cable 68x has an end attached to the larger end of this drum and its other end dead-ended in a block 72 that is welded to the upper end portion of bar 12. In this present instance the cable 68x is a continuation of cable 68 and both are dead ended in the flange at the larger end of drum 71. Thus the spring 65, at all times effects the application of a downward pulling force on bar 12. However, this force is not sufficient to effect any upward lifting of the housing relative to bar 12.

It is shown in Figs. 4 and 6 that the arrangement of the conical drum on the shaft 70, and the attachment of cable 68 to the shaft 70 and cable 68x to drum is such that when the spring 65 is permitted to contract, it operates through cable 68 to rotate the shaft 70 and drum in such direction that the cable 68x will be wound onto the conical drum from its larger toward its smaller end. This is to compensate for the decrease in power or pull of the spring as it gets shorter. This spring powered mechanism operates to pull the bar 12 downwardly thus to take in the slack as produced in the load lifting cable 16 after the bar 13 has been lowered into position of support by tongs or log, thus to maintain the housing 10 in that substantially upright position which is necessary for the engaging of the latch 44 with stop 41. It is to be explained, however, that the tension of the spring is not sufficient to lift the housing 10 relative to bar 12 except under the conditions above mentioned.

With the engagement of the latch 44 with the bar stop 41, a direct lifting connection is established between the bar 40 and the housing 10, and about twelve inches of slack has been produced in the connection that had previously existed by reason of the engagement of the blocks 12x and 13x on bars 12 and 13. The parts then are in position seen in Fig. 10.

With the parts in position of Fig. 10, the operator then causes the hoisting cable 16 to be wound in and the housing 10 to be lifted through the holding connection effected by latch 44 and bar 40.

With the upward lifting of housing 10, the tong release chain 30 becomes taut and before the lug 12x on bar 12 has moved upward into contact with lug 13, pulls the jaw of the tong, to which it is attached, free of the log. This action ultimately results in full release of the other jaw of the tongs from the log and the tongs will swing free.

It will here be mentioned that although not herein shown, it may be desirable and practical for some operations that release chains 30 be applied to both jaws of the tongs. If so, the connection of the other jaw would be made in the same manner as already described.

When the tongs have been cleared from one log, they may be carried in the open position to another, ready for application thereto, and there reset for their automatic application to the log. The means for effecting the release or resetting of the tongs for such application to a log will now be described.

In Figs. 9 and 11 it is best shown that a cross-shaft 75 extends horizontally through the flanges c—c near the upper end of housing 10. Pivoted on this shaft, between the flanges, is a pair of parallel, downwardly directed levers 76—76, rigidly joined across their upper ends by a cross plate 77. Extended rotatably through the lower ends of the levers 76—76 is a cross shaft 78. Opposite end portions of this shaft extend through horizontal slots 79—79 in the flanges c—c to the outsides of the flanges as in Fig. 8, and welded to these opposite end portions are lever arms 80—80 that extend substantially horizontally through openings in flanges b—b and d—d, to the opposite side of housing 10 where they are joined by a horizontal cross rod 81 which is the actuator for the latch release lever 60. This cross rod extends freely through openings in the flanges a—a as observed in Fig. 8.

Fixed to the cross plate 77 is an upwardly and outwardly directed arm 84, and attached to the outer end of this is the lower end of a coiled spring 85; the spring is attached under tension to an ear 87 on the upper end of housing 10, and thus it operates at all times to urge the lower ends of lever arms 76—76 and the cross rod 78 mounted thereby, to the outward position, in which they are shown in Fig. 11.

Welded rigidly to the cross shaft 78, medially of its ends, is an upwardly extending angular, cam lever 90. This is formed with an inwardly directed upper end portion 90' that, extends into a vertical slot 91 in the adjacent side wall of the housing for contact with and actuation by the bar 13, as best understood by reference to Figs. 9 and 11.

Pivoted on the cross shaft 78 at opposite sides of the cam lever 90 are paired, downwardly extending links 92—92 which at their lower ends are connected by means of a horizontal pivot pin 93 with the outer end of a cam lever 94. This lever is pivotally mounted, between its ends, on a cross pin 95 extended between spaced ears 96—96 on the adjacent housing wall. The upper end portion of lever 94 extends inwardly through a slot 97 in the adjacent side wall of the housing 10 for contact with and actuation by the bar 13.

As will be understood by reference to Figs. 9 and 11, the parts 76—76 and 92—92, as pivotally joined by the cross shaft 78, form a toggle linkage that, under the influence of cam lever 94 and spring 85 will be caused to break outwardly and inwardly between the different positions shown in these views, and it is this action that causes the engaging and actuation of the latch release lever 60 by the cross rod 81.

It is to be understood that with the lifting of the housing 10 by cable 16 after the latch bar 44 has been engaged with lug 41 on bar 40, the bar 13 drops down in housing 10 from position of Fig. 10 to the position shown in Fig. 11. With this movement of bar 13, it disengages the inner end of the then upwardlly directed lever 94 and the toggle linkage is permitted to be actuated by spring 85 to its outward position as in Fig. 11. This causes the levers 80—80 to pull the cross rod 81 from above to the inside of the upper end of the lever 60, where it drops down as in Fig. 11, to the level of the notch 60x in the lever; this drop being permitted by reason of the end portion 90' of cam lever 90 then being in the clear of the bar 13.

After the tongs have been disengaged from a log, they are carried in suspension by the chain 30 in a laterally opening position, ready for application to another log. The bars 12 and 13, the latch 44 and the latch releasing devices including the toggle linkage are in the positions relative to each other shown in full lines in Fig. 11. The automatic release of the mechanism for application of the tongs, and the resetting of parts is as follows:

With the open tongs lowered to and properly disposed relative to the log that is to be picked up, for example as in Fig. 1b, or directly over the log if it is small, the hoist operator carefully pays out the cable 16, causing the housing 10 to be lowered in a manner to place the laterally opening tongs in gripping position. After the tooth of the upper jaw has caught in the log, the bar 13, as supported by the clevises 19—19', comes to rest. Then, a continual lowering of the housing 10, as still supported by the cable through the latch mechanism, causes it to move downwardly along bar 13. With the initial downward travel of housing 10 relative to bar 13, the inner end portion of cam lever 94, which at this time is extending inwardly through slot 97, will be contacted by the upper end of bar 13 and thereby actuated upwardly and outwardly, thereby pulling downwardly on the toggle linkage and causing it to straighten out, as from its full line position of Fig. 11 to the dotted line position. In this action of the toggle linkage, the lever arms 80—80 are shifted to the left, in reference to showing in Fig. 11, to cause cross rod 81 to push the upper end of lever 60 outwardly and thereby effect displacement of the lower end of latch 44 from stop 41. The latch will then be momentarily retained in released position by reason of the cross rod 81 remaining seated in notch 60x of the lever.

With release of latch 44, from stop 41, the housing 10 drops freely downward to its full extent relative to the bars 12 and 13 and this causes the upper end portion of cam lever 90, then projecting through slot 91, to be engaged with the upper end portion of the relatively stationary bar 13, to rotate shaft 18 and swing the lever arms 80—80 upwardly, thus to dispose the cross rod 81 above and in the clear of lever 60; the latch parts then assuming the normal position of Fig. 9. Then, the operator winds in the cable 16 and lifts the housing 10 through the mediacy of the inter-engaged lugs 12x and 13x of the bars 12 and 13. The tongs will be lifted by bar 13 and they they will automatically close on the log to which they have been applied.

If it is desired, a tag line, as at 100 in Fig. 1, can be attached to the housing to control its position and prevent its being rotated under influence of the hoisting cable 16 and its tendency to rotate under load.

Having thus described my invention, what I claim as new therein, and desire to secure by Letters Patent, is:

1. In combination, a hoisting cable, a pair of load lifting tongs, a housing, a bar contained vertically therein and connected at its upper end to the cable, another bar contained vertically in the housing and having a load lifting connection at its lower end with the tongs; said bars being independently movable endwise in the housing and relative to each other between an extended and a retracted relationship, and said housing having limited movement along the bars, means associated with the bars for effecting a load lifting connection between them when fully extended relative to each other and providing slack in the said load lifting connection when they are not in fully extended relationship, a tie member connecting the housing with a jaw of the tongs for its extraction from a load, and latch means operable to effect a load lifting connection between the first mentioned bar and said housing when the said bars are in a slack producing relationship, through which pull of the hoisting cable can be applied to said jaw of the tongs for its extraction.

2. In combination, a pair of load lifting tongs, a hoisting cable, a housing, a pair of bars mounted in the housing for endwise movement therein relative to each other and for telescopic movement into and from the housing independently of each other; the first of said bars having its upper end portion extended upwardly from the housing and connected to the hoisting cable, the second of said bars having its lower end portion extended downwardly from the housing and having a connection with the tongs, and said bars having a load supporting connection between them when fully extended relative to each other, a latch stop on the upper bar, a latch lever mounted on the housing and operable to engage the latch stop to lock the upper bar in a position fully telescoped in the housing, providing slack in the load lifting connection, and a tie member joining the housing and one jaw of the tongs for the extraction of that jaw from an engaged load by pull of the hoisting cable applied through the said tie member and the upper bar and housing as thus latched together.

3. A combination as recited in claim 2 including a latch release mechanism operable through the mediacy of the second of said bars by the telescoping of said bar into the housing.

4. In combination, a pair of load lifting tongs, a hoisting cable, a housing, a pair of parallel bars overlapped one with the other in said housing and telescopically movable into and from the same; the first of said bars having its upper end portion extended upwardly from the housing and connected to the said hoisting cable; the second of said bars having its lower end portion extended downwardly from the housing and having a load supporting connection with the tongs, lugs on the inner ends of the bars adapted to engage one with the other to provide a load supporting connection between the bars when they are fully extended relative to each other, and disengageable from each other to provide slack in the connection between cable and tongs when the bars are not fully extended relative to each other, said housing having limited movement along the bars when they are fully extended relative to each other, a latch stop on the first bar and a latch lever on the housing operable to engage the stop when the said first bar is substantially telescoped within the housing, to lock the housing to the bar, and a chain connecting the housing and a jaw of the tongs, through which an extracting pull can be applied by the cable to the jaw through the said first bar and housing as thus latched together and while there is a slack condition in the bar connection.

5. A combination as recited in claim 4 including a latch lever disengaging mechanism mounted on the housing, and operable by the second bar when moved from a position extended from the housing to a position telescoped therein.

6. Apparatus as recited in claim 4 including a spring attached under tension to the cable and housing and operable to take up slack as produced in the hoisting cable while the housing is supported through the mediacy of the second bar, and wherein the said chain is of a length that, with the tong to which it is attached secured in a load, it will retain the said housing in its lowered position on the extended bars.

7. In combination, a pair of load lifting tongs, a hoisting cable, a tubular housing, a pair of parallel bars that are overlapped one with the other in said housing and independently telescopically movable therein; the first of said bars having its upper end portion extended from the housing and joined with said hoisting cable, the second of said bars having a load lifting connection at its lower end with the tongs, stops on the inner ends of the bars adapted to be engaged to provide a load supporting connection between the bars when they are fully extended relative to each other and disengageable from each other to provide slack in the load lifting connection, said housing having limited up and down movement along the bars, when they are extended relative to each other and no movement when both are fully telescoped thereinto, a latch bar fixed to the upper end of the first bar and extended downwardly along the housing, a stop on said latch bar, a latch lever pivoted on the housing, yieldable means urging the latch lever against the bar to urge it to position to engage with the said stop upon the complete telescoping of the first bar into the housing, a chain joining the housing and one jaw of the tong for the extraction of the jaw from a load, and a spring attached under tension to the housing and first bar to draw slack in the bar connection when the cable is paid out for a latch setting operation and the housing is supported through the said second bar.

8. A combination as recited in claim 7 including a latch release lever that is mounted pivotally between its ends on the movable end of the said latch lever; said release lever having one end portion thereof extended beyond the end of the latch lever to engage a fulcrum member, and there being other lever mechanism mounted on the housing and operable against the other end of the said release lever for the disengaging of the latch lever from the stop; said other lever mechanism being disposed for actuation by the said second bar in its upward travel in the housing.

9. In combination, a pair of load lifting tongs, a hoisting cable, a housing, a pair of parallel bars overlapped one with the other in said housing and independently telescopically movable therein; the first of said bars having its upper end portion extended upwardly from the housing and connected to the said hoisting cable; the second of said bars having its lower end portion extended downwardly from the housing and having a load supporting connection with the tongs, lugs on the inner ends of the bars adapted to engage one with the other to provide a load supporting connection between the bars when fully extended relative to each other, and disengageable from each other to provide slack in the connection between cable and tongs when the bars are not fully extended relative to each other, said housing having limited movement on the bars when fully extended relative to each other, and a latch mechanism associated with the housing and the first of said bars for locking the first bar fully telescoped in the housing while permitting the second bar to have movement into and from the housing, and a latch disengaging mechanism on the housing operable from a retracted to an extended position to disengage the latch under influence of the said second bar incident to its being lifted from an extended position to a position telescoped within the housing.

10. A combination as in claim 9 including also, a spring actuated means operable under control of the said second bar to return the latch disengaging mechanism to its retracted position.

*11. In combination, a load lifting cable, a pair of tongs, a load lifting connector interconnecting the cable and tongs, a flexible tong extracting connector secured at one end to one of the tongs and secured at its other end to the load lifting connector, said load lifting connector comprising a housing and bar means projecting through the housing, said bar means including first and second portions relatively movable within said housing, latch means carried by the housing in fixed position thereon, and means associated with the first portion of the bar means adapted to engage with the latch means to hold said first portion of the bar means within the housing, and thereby determine the effect of the lifting connector so as to produce load lifting or tong extracting, and latch disengagement means carried by the housing and adapted to be engaged by the second portion of said bar means as the lifting connector is engaged with a log to cause relative movement between said housing and said second portion of the bar means and engage said second portion of the bar means with the latch disengaging means to automatically release the means associated with said first portion of the bar means.*

References Cited in the file of this patent or the original patent

UNITED STATES PATENTS

| | | |
|---|---|---|
| 768,253 | Watson | Aug. 23, 1904 |
| 1,558,778 | Bennington | Oct. 27, 1925 |
| 1,733,236 | Pearce | Oct. 29, 1929 |
| 2,382,227 | Hopkins et al. | Aug. 14, 1945 |

FOREIGN PATENTS

| | | |
|---|---|---|
| 627,807 | Great Britain | Aug. 16, 1949 |